United States Patent [19]
Sgro

[11] Patent Number: 5,770,949
[45] Date of Patent: Jun. 23, 1998

[54] DEVICE FOR ON-LINE MEASURING OF THE THICKNESS OF A CONTINUOUSLY PRODUCED SHEET

[75] Inventor: Marziano Sgro, Buccinasco, Italy

[73] Assignee: Aeonic Systems Italia S.r.L., Italy

[21] Appl. No.: 737,046

[22] PCT Filed: May 5, 1995

[86] PCT No.: PCT/IT95/00067

§ 371 Date: Nov. 4, 1996

§ 102(e) Date: Nov. 4, 1996

[87] PCT Pub. No.: WO95/30877

PCT Pub. Date: Nov. 16, 1995

[30] Foreign Application Priority Data

May 10, 1994 [IT] Italy ................................ MI94 A 0915

[51] Int. Cl.$^6$ ............................ G01B 7/06; G01B 13/06; G01B 13/12; D21F 7/06
[52] U.S. Cl. .......................... 324/229; 73/159; 162/263; 324/231
[58] Field of Search ........................... 324/226, 229–231, 324/262; 73/37.7, 159; 162/263; 271/262, 263; 340/675

[56] References Cited

U.S. PATENT DOCUMENTS

| | | | |
|---|---|---|---|
| 3,528,002 | 9/1970 | Dunlavey | 324/231 |
| 3,855,524 | 12/1974 | Crawford | 324/231 |
| 4,929,895 | 5/1990 | Typpo | 324/231 |
| 5,132,619 | 7/1992 | Typpo | 324/231 |
| 5,243,849 | 9/1993 | Williams | 73/37.7 |

FOREIGN PATENT DOCUMENTS

| | | |
|---|---|---|
| 0064325 | 11/1982 | European Pat. Off. . |
| 0078095 | 5/1983 | European Pat. Off. . |
| 84/02772 | 7/1984 | WIPO . |
| 91/15730 | 10/1991 | WIPO . |

*Primary Examiner*—Gerard R. Strecker
*Attorney, Agent, or Firm*—Londa and Traub LLP

[57] ABSTRACT

A measuring device scanning from edge to edge of a continuously fed sheet includes two sensing heads spaced apart from the sheet by air cushions whose thickness is not influenced by pressure of supplied air and is subjected to an invariable approaching gravimetric force. The air cushions are preferably formed of air jets from calibrated holes at the inside of both sensing heads, each of said holes being surrounded by annular barriers with circular rims. While the approaching force applied to the upper head is given by the own weight of the latter, the corresponding opposed force on the lower head is provided by a pressure regulator of internal air at the inside of the lower sensing head.

3 Claims, 3 Drawing Sheets

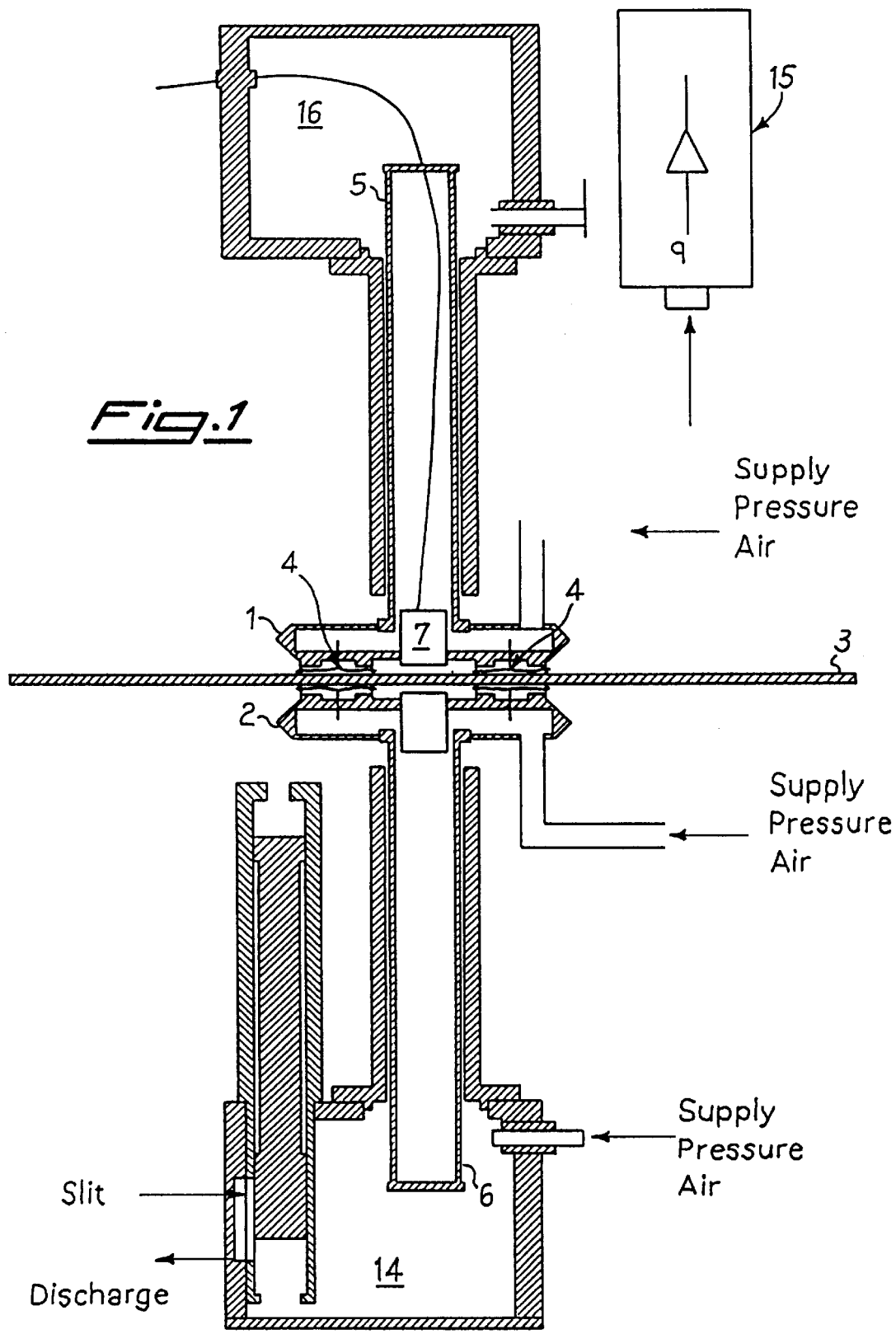

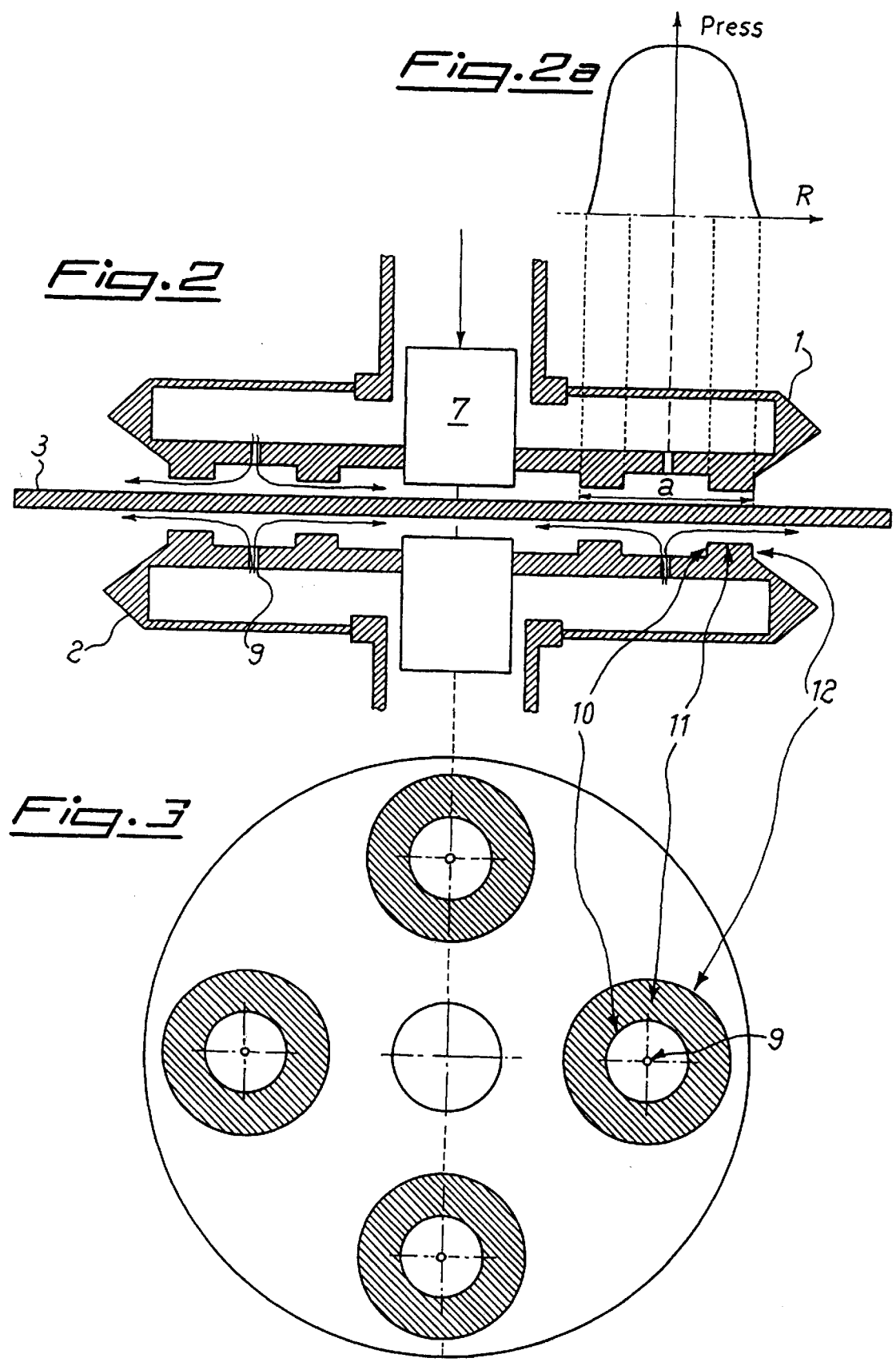

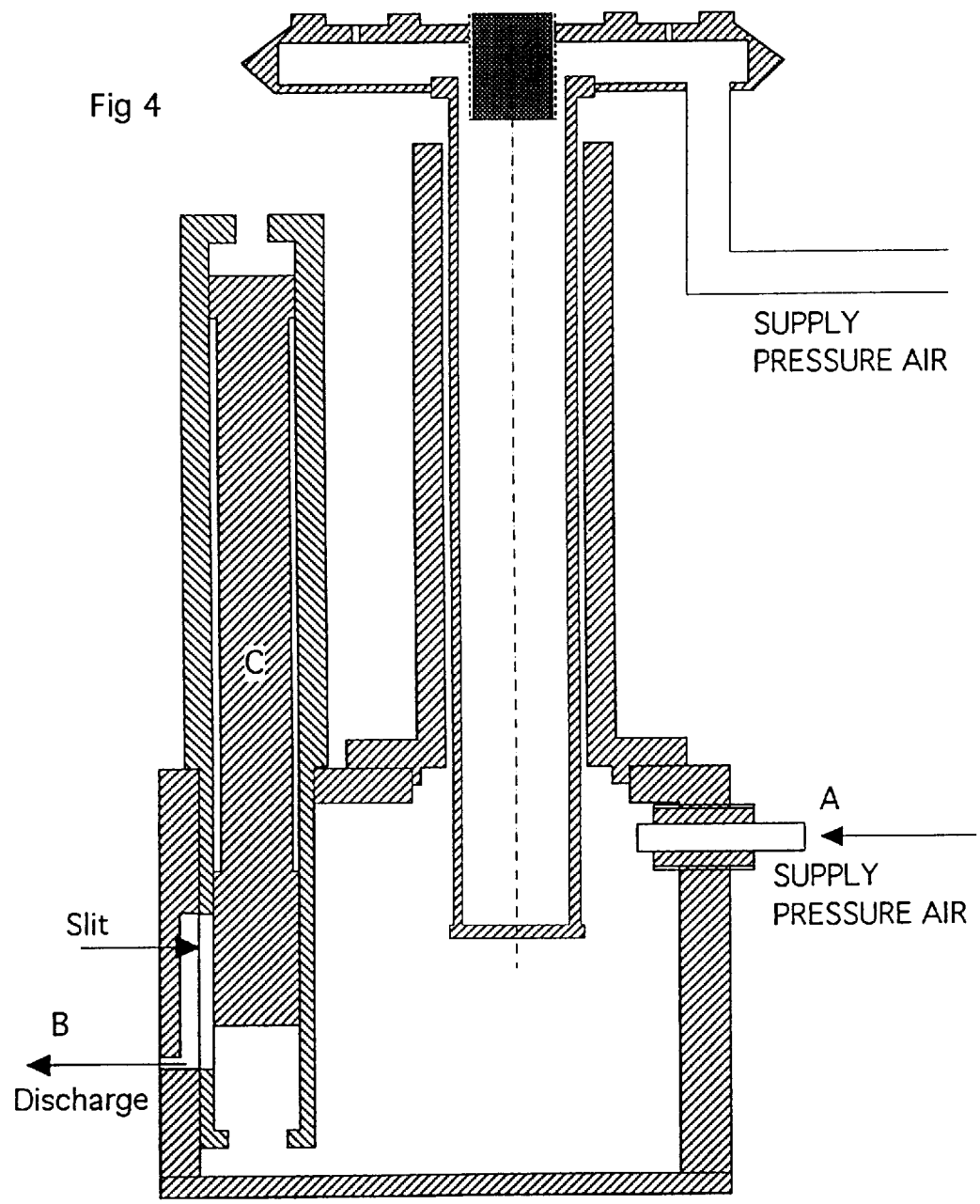

DEVICE FOR ON-LINE MEASURING OF THE THICKNESS OF A CONTINUOUSLY PRODUCED SHEET

The present invention relates to a device for on-line measurements of the thickness of a continuously produced sheet. It is known that the industries producing continuous sheet material such as paper, rubber, plastics encounter an increasing need of a measuring device able to precisely indicate without direct contact the variations of thickness from edge to edge of the sheet while it is fabricated. In fact the increasing speed of production makes it not adequate the traditional off line tests which are normally done at the end of the roll with a micrometer on a cross machine strip.

For such a reason the world leading producers of on-line measurement systems for sheet material have been engaged for several years in the development of thickness sensors capable of traversing continuously from edge to edge of the sheet by meeting adequate accuracy and reliability requirements. The degree of accuracy needed nowadays for thickness sensors is in the order of a micrometer ($10^{-6}$ m) or less for the thinnest sheets.

The technique generally used for this category of measuring devices is based on two opposite sensing heads comprising a magnetic sensor of relative distance capable of moving on the sheet without friction. It is to be noted that, being a basic requisite of this measuring device the continuous scanning from edge to edge of the sheet, the sensing heads must be mounted on two supports traversing on proper guides longer that the sheet width. It is worth saying that modern lines producing printing paper can be 10 meter wide and have a speed over 1000 meter/min.

In order to make the sensing heads frictionless and to avoid their contact with the sheet surface, the commonly adopted method is the air-cushion technique implemented by means of suitable air jets emitted from the surface of the sensing heads facing the sheet. The jets produce a thin layer of air under pressure which maintains the heads at a distance from the sheet eliminating the friction. In this technique the degree of accuracy of the measurements is mainly dependent on the degree of invariability and repeatability of the thickness of the air cushion.

A device functioning according to the above principle is illustrated in publication WO 84/02772. In this case each of the two opposite sensing heads is attached to a sliding piston moving axially with respect to the plane of the sheet, and it is urged toward the sheet by the force exerted by the feed air pressure in a pressurized rear chamber acting on the piston counteracting the repulsive force of a single frontal air cushion fed by the same pressure air conveyed through the hollow of the piston via its opened far end. Since the equilibrium of the two counteracting forces must be ensured at unchanged cushion gap, the repulsive force has to vary proportionally to the feed air pressure in the same manner as the urging force applied to the piston.

In this described embodiment the effective air cushion is delimited by the inner edge of the annular barrier which creates a restriction to the radial air flow causing a sharp drop of pressure between the internal area and the ambient. The sucking phenomenon occurring in the area immediately outside the edge, due to Bernoulli principle, is incidental and does not play any specific role, its sole effect being that of reducing marginally the repulsive force exerted by the internal positive pressure area.

The own weight of the floating heads should also be considered whenever a rigorous analysis of equilibrium of forces is to be done, but it has been considered negligible by this inventor because of the light floating head-piston assembly compared to the large counteracting pneumatic forces of several newtons.

It is an object of the present invention to provide a device of the above-mentioned type in which the thickness of the air cushion between sensing heads and the sheet to be measured is kept as constant as possible independently from the pressure of air fed.

This is obtained through the features of the measuring device of the within invention for scanning from edge to edge of an industrial sheet characterized by two disks shaped hollow sensing heads which face each other on opposite sides of the sheet. The sensing heads are pressurized by compressed air from an external source, and are separated from the continuous sheet surfaces by air layers produced by multiple air cushions. The sensing heads further are mounted on pistons which slide along a path perpendicular to the plane of the sheet plane and are guided by the bore of a pipe connected to a sealed rear chamber housing the rear portion of each associated piston. Magnetic sensors are centrally located in each sensing head for generating a signal proportional to the distance between the sensing heads, from which a measurement of the thickness of the sheet can be derived. Each sensing head also has a number of air cushions placed on its base facing the sheet symmetrically located at a suitable distance around the center to leave enough space for the central magnetic element to be out of the air cushion pressure fields. Each air cushion is formed by an outcoming jet of air from a calibrated hole located at the center of a circular recessed land surrounded by a flange-shaped annular barrier protruding toward the sheet. The annular barrier has a base located next to the sheet surface and is shaped as a flat annular band which extends outwardly in the radial direction so that its area is substantially larger than the area of the inner recessed land. The annular band and the contiguous sheet surface form an extended restricted passage for the outwardly escaping air, causing a relevant pressure drop due to laminar friction and a substantial concurrent compression caused by air velocity decrease due to the radial structure of the air stream so that the air cushion pressure pattern is mainly determined by these two phenomena. The effective air cushion region is delimited by the outer periphery of the annular band, the two phenomena producing opposite effects to compensate variations of fed air pressure around its nominal value, whereby no variation of the repulsive force exerted by the air cushions at constant air cushion gaps is produced. The repulsive force acting on the upper sensing head is counteracted by the weight of the head-piston assembly, with the associated rear chamber open to the ambient pressure, whereas the repulsive force acting on the lower head is counteracted by the action of the piston caused by the pressurized air in the associated rear chamber, maintained at constant pressure by a pressure regulator such that the net upward, sheet-approaching force applied to the lower sensing head equals the downward, sheet-approaching force applied to the upper sensing head.

Other objects and advantages of the device according to the invention will be clearer from the following description of a preferred embodiment thereof with reference to the annexed drawings in which:

FIG. 1 is a schematic sectional view of the device according to the invention in a plane perpendicular to the sheet whose thickness is to be measured;

FIGS. 2 and 2a are respectively an enlarged view of a particular of FIG. 1, i.e. the portion of device near to the sheet, and a graph showing the air pressure values under an annular barrier;

FIG. 3 is a plan view of a sensing head of the device according to the invention; and FIG. 4 is a more detailed view, similar to FIG. 1, showing only the part of device relating to the lower head.

DESCRIPTION OF PREFERRED EMBODIMENT

With reference to FIG. 1 the sensor comprises two sensing heads 1 and 2 facing the opposite surface of the sheet 3, separated therefrom by two air layers.

One of the sensing heads comprises the active member of an inductive sensor 7 generating an electric signal proportional to the distance between the two heads, while the other comprises the associated target (usually made of ferrite). Because the subject measuring device is designed to move across the sheet, it is mandatory that the heads are able to open up to a sufficient clearance to avoid a collision against the sheet edge when they enter the sheet. In addition, being the sheet path is subject to flutter, i.e. making small movements in a direction perpendicular to the sheet plane mainly due to variations of sheet tension, the two heads must be free to move up and down perpendicularly to the sheet plane while measuring without changing the pressure applied to the sheet itself. In order to obtain the above mentioned objectives each of the two sensing heads is mounted on a piston, respectively 5 and 6, guided by the bore of an associate vertical pipe along a path perpendicular to the sheet.

Each of said pipes is connected to a rear sealed chamber (14 and 16). The upper chamber 16 is connected to a Venturi tube 15 that, when it is fed with compressed air through its entrance P, produces a suitable vacuum in the same chamber, capable of lifting the head/piston assembly 1+5.

During the measuring phase the compressed air to the Venturi tube is closed by an electrovalve (not shown) and it acts as an open passage connecting the upper chamber 16 to ambient pressure. In this condition the head assembly is urged against the sheet by its own weight only, which comprises the weight of the head 1 and the weight of the associated piston 5.

With reference to FIG. 4 the chamber 14 of the lower head during measuring phase is kept at a given pressure by means of a constant air input A and a variable discharge regulated gravimetrically. The internal pressure is controlled at a level such that a net force equal to the total weight of the upper head is applied also to the lower head. During the non-measuring phase the air supply is closed in order to let the lower head fall away from the sheet by means of gravity.

With reference to FIG. 2 and FIG. 3 the internal hollow of each sensing head 1 and 2 of circular shape, is maintained under pressure by a common pressurized air supply (not shown). Multiple air jets are emitted against the sheet surfaces from the base of each sensing head through calibrated holes 9 symmetrically placed. Each hole is at the center of a circular recessed area a surrounded by an annular barrier 10 protruding toward the sheet with its base 11 contiguous to the sheet surface shaped as a flat annular band extending outwardly in the radial direction so that its area is substantially larger than the area of the internal recessed land a, typically three times larger or more, so that the force due to the pressure field applied to the annular band is the predominant part of the total force exerted by the air cushion, thus the effective air cushion region is delimited by the outer periphery 12 of the barrier. The annular band 11 and the contiguous sheet surface portion form an extended restricted passage for the air escaping outwardly from the inner recessed land, causing a relevant pressure drop due to the associated laminar friction and a competing significant compression caused by the air velocity decrease due to the radial structure of the air stream. With said special geometry the pressure pattern of the whole air cushion region is mainly determined by the two mentioned phenomena.

FIG. 2a gives an approximate indication of the behavior of the pressure of said air cushion. The pressure of the air escaping under the annular band must decrease so that a positive pressure field is established providing the necessary repulsive force, which means that the effect due to laminar friction must have a larger magnitude than the one due to air velocity decrease.

Being that the magnitude of the two above mentioned phenomena are related to the air flow rate and consequently to the feed air pressure, but that the effect due to laminar friction is only proportional to the flow rate, whereas the effect related to the decrease in air velocity is proportional to the square of said flow rate, with a proper selection of the geometrical parameters, i.e., of the internal and external radius of the annular barrier 10, and of the pressure of the common air supply, it is possible to obtain a working point such that the derivative terms of the dynamic effects associated to said two phenomena compensate each other. In this condition even variations of ±10% of supply air pressure around its nominal value will cause only negligible variations of the air cushion repulsive force. The air cushions of each sensing head are symmetrically placed around its center at a suitable distance from it to leave enough space to the centrally located inductive sensor, which must be out of their pressure fields.

The downward, sheet-approaching force applied to the upper sensing head during measuring mode is provided by its own weight which balances the repulsive force of the frontal air cushions. In order to obtain the same degree of invariability also for the upward, sheet approaching force applied to the lower sensing head the following arrangement has been adopted.

With reference to FIG. 4 the lower chamber is fed by a constant air flow through passage A, the internal air discharges to the outside through the slit S. The aerodynamic resistance of the latter is dependent on the vertical extension of its opening h which in turn depends on the vertical position of the sliding cylindrical shutter C. The vertical position of this last element is determined by the balance of the external forces applied to it which include its own weight and the force exerted by the pressure of air applied to its bottom base. Therefore the internal pressure of the lower chamber will be always proportional to the weight of said shutter, independent from any other physical parameter as input air flow, air viscosity . . . By choosing the weight of the shutter corresponding to a pressure of the lower chamber such that its force applied to the piston balances its total weight plus the weight of the upper head piston, the net upward, sheet approaching force applied to the lower sensing head will be equal to the downward, sheet-approaching force of the upper sensing head, and unvariable.

I claim:

1. A measuring device for scanning from edge to edge and measuring the thickness of an industrial continuous sheet, comprising; upper and lower disk-shaped hollow sensing heads facing each other on the opposite sides of the sheet, said sensing heads being pressurized by compressed air from an external source, and being separated from the continuous sheet surfaces by air layers produced by multiple air cushions, wherein said sensing heads are mounted on pistons which slide along a path perpendicular to the sheet plane and are guided by the bore of a pipe connected to a sealed rear chamber housing the rear portion of each associated piston; each sensing head being equipped with a magnetic sensor centrally located which generates a signal proportional to the distance between the sensing heads from which a measurement of thickness of the sheet can be derived; each sensing head further comprising a number of air cushions placed on its base facing the sheet and symmetrically located at a suitable distance around the center to leave enough space for the central magnetic element to be out of the air cushion pressure fields; each air cushion being formed of an air jet outcoming from a calibrated hole located at the center of a circular recessed land surrounded by a flange-shaped annular barrier protruding toward the sheet, the annular barrier having a base next to the sheet surface shaped as a flat annular band extending outwardly in the radial direction so that its area is substantially larger than the area of the inner recessed land; the annular band and the contiguous sheet surface forming an extended restricted passage for the air escaping outwardly causing a relevant pressure drop due to laminar friction and a substantial concurrent compression caused by air velocity decrease due to the radial structure of the air stream so that the air cushion pressure pattern is mainly determined by said two phenomena, and the effective air cushion region being delimited by the outer periphery of the annular band, said two phenomena producing opposite effects to compensate variations of fed air pressure around its nominal value, whereby no variation of repulsive force exerted by the air cushions at constant air cushion is produced; said repulsive force acting on the upper sensing head being counteracted by the weight of the upper sensing head-piston assembly, with the associated rear chamber being open to the ambient pressure, whereas said repulsive force acting on the lower sensing head being counteracted by the action of the lower sensing head piston caused by the pressurized air in the associated rear chamber maintained at constant pressure by a pressure regulator such that a net upward, sheet-approaching force applied to the lower sensing head equals the downward, sheet-approaching force applied to the upper sensing head.

2. The measuring device according to claim 1, wherein the pressure regulator of a lower rear chamber is gravimetrically controlled and integrated in the chamber by means comprising a vertical pipe having a lower portion sunk in the rear chamber with a bottom opening in communication with the internal air of said chamber, an upper portion extending upwardly above the rear chamber with its upper end open to the ambient pressure, having a thin vertical slot communicating with the ambient air on its lateral wall near its bottom; a cylindrical shutter housed within said pipe, the vertical position of the shutter determining the vertical extension of the passage for the escaping air through the slot and consequently the effective resistance encountered by the air flow from the chamber to the outside so that the pressure established in the rear chamber, fed with a constant flow of air from an external source, is dependent on the vertical position of said shutter, being in equilibrium at a condition in which its weight is balanced by the force exerted to its bottom base by the pressure in the chamber, while the weight determines an internal pressure in the lower rear chamber that produces a force to the piston equal to the sum of the weights of the upper and lower sensing head-piston assemblies.

3. The measuring device according to claim 1 capable of retracting the sensing heads into a non-measuring condition by means comprising the upper rear chamber being connected to the output of a Venturi tube, which, in non-measuring condition is fed with pressure air producing a vacuum in said rear chamber capable of lifting the upper head; the input fed air to said tube being closed by means of an electrovalve so as the Venturi tube acts as an open passage connecting the upper chamber to ambient pressure letting the upper sensing head approach the sheet by means of its own weight in measuring condition, the retraction of the lower head being caused by the closing of the fed air to the pressure regulator producing positive pressure in the lower rear chamber by means of an electrovalve so that no positive pressure is produced in said chamber which allows the lower head to retract from the sheet by means of gravity in the non-measuring condition.

* * * * *